(No Model.) 2 Sheets—Sheet 1.

G. H. PRESTON.
INDICATOR.

No. 313,235. Patented Mar. 3, 1885.

Witnesses:
Mary Preston
George Preston

Inventor:
George Honey Preston (No Model.) 2 Sheets—Sheet 2.
G. H. PRESTON.
INDICATOR.
No. 313,235. Patented Mar. 3, 1885.
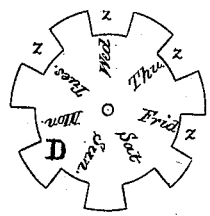
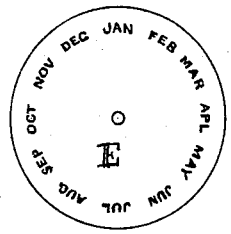
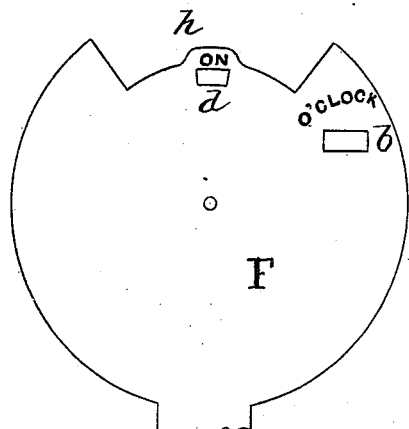
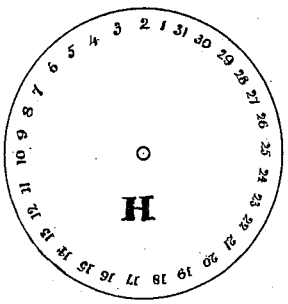
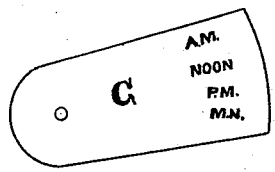
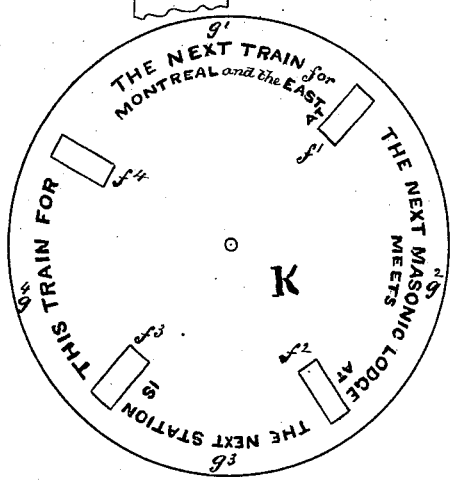
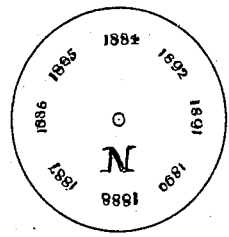
Witnesses:
Mary Preston
George Preston
Inventor:
George Honey Preston,

UNITED STATES PATENT OFFICE.

GEORGE HONEY PRESTON, OF OTTAWA, ONTARIO, CANADA.

INDICATOR.

SPECIFICATION forming part of Letters Patent No. 313,235, dated March 3, 1885.

Application filed March 6, 1884. (No model.)

*To all whom it may concern:*

Be it known that I, GEORGE HONEY PRESTON, a citizen of the Dominion of Canada, residing at Ottawa, in the county of Carleton, in the Province of Ontario and Dominion of Canada, gentleman, have invented a certain new and useful Business-Indicator, of which the following is a description.

My invention has reference to that class of indicators in which the parts of the indicator are superposed over one another; and its novelty consists in rendering it applicable to various purposes for which the ordinary indicator could not be made useful. It is attained by various forms and combinations shown and described in the following specification.

Figure 1:
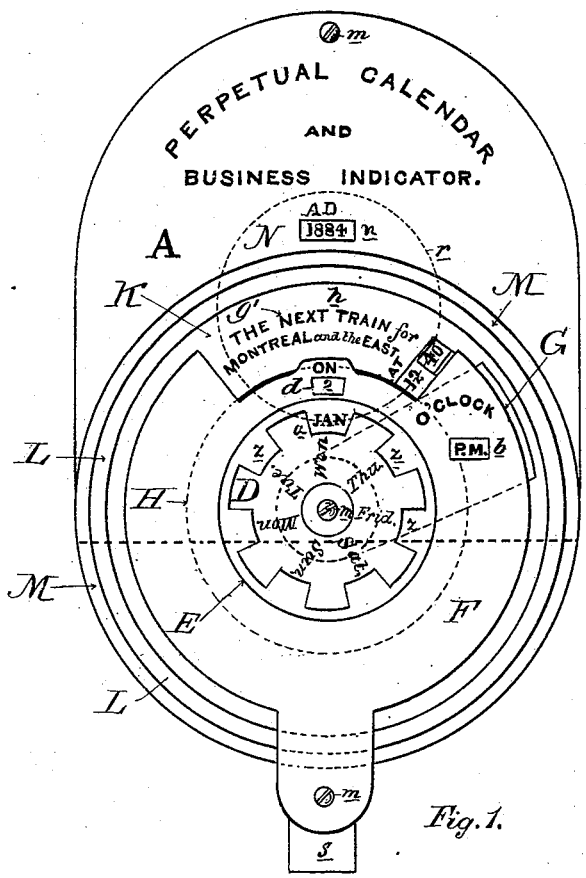
Figure 2:
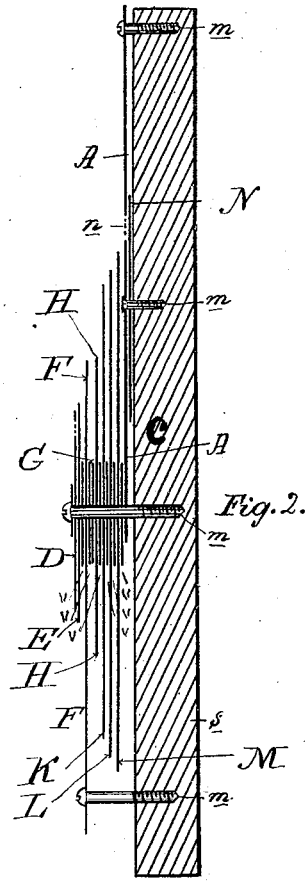
Figure 9:
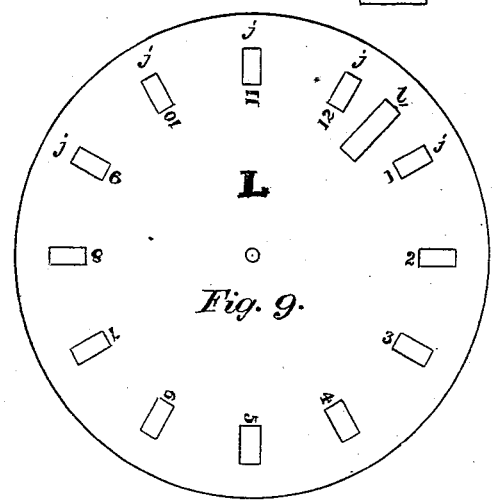
Figure 10:
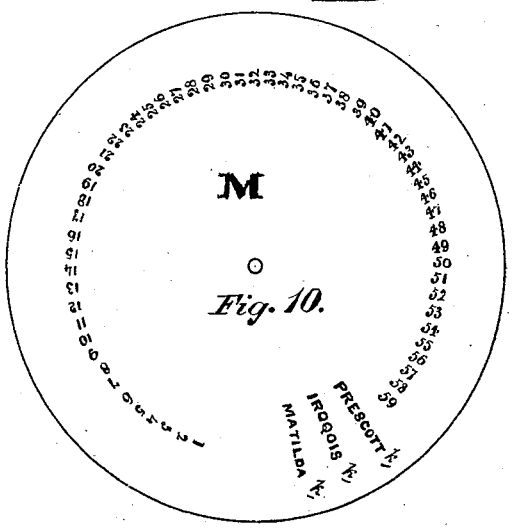

In the annexed drawings, Figure 1 is a front face view of my improved indicator; Fig. 2, a vertical central section of the same; Figs. 3 to 11, inclusive, face views of the various disks employed in the construction of the device.

The indicator consists, essentially, of a board or backing having guards or face-plates provided with suitable openings, and a series of cards, each having suitable figures or inscriptions, to be turned or brought opposite to their respective openings, so as to indicate the day of the week, the month, the year, a particular hour or time of the day, and a special event or occurrence, as the meeting of a society, the arrival or departure of a train, the next railway-station, or whatever the information desired may be.

Referring again to the drawings, $s$ indicates a board or backing of suitable dimensions, and A, a plate or guard of sheet metal, card-board, or other suitable material, secured to the board by screws or pins $m$ $m$, a slight space being left between the guard and board to receive a circular plate or disk, N, which is shown detached in Fig. 11, bearing figures arranged in a circle and representing various years, the drawings showing the years 1884 to 1892, inclusive.

The plate or guard A bears a suitable inscription to indicate its purpose, and may also contain directions for use, or advertising matter, and is formed with an opening, $n$, at a point to register with the circle of figures of disk N, which disk is mounted upon and turns about one of the screws, $m$, as a center. By turning the disk N the desired year may be shown through opening $n$.

In front of guard A, and swiveled or centered upon a screw, $m$, below that on which disk N is mounted, I arrange an outer disk, D, having seven notches or peripheral indentations, $z$, between which the names of the days of the week, abbreviated or not, are arranged radially, as shown in Figs. 1 and 3.

Immediately behind disk D is placed a disk, E, of slightly greater diameter, bearing the names of the months, or abbreviations thereof, arranged in a circle, and at such distance from the central pivot or axis as to cause them to come one at a time into line with the notches $z$ when properly adjusted. As there are twelve of the names and only seven notches, it follows that but one name can come squarely and fully opposite a notch or opening $z$ at any one time, and in adjusting the disks the names of the months will be arranged to register with the uppermost notch or opening. The disk being set to bring the proper month to the top, the disk D is next adjusted to bring the name of the proper day of the week perpendicular thereto, as "Wednesday" in the drawings, Fig. 1.

Immediately back of disk E is a guard or plate, F, the form of which is more plainly indicated in Fig. 5. As shown in said figure, the guard is provided with a tag or tongue at its lower end, through which a screw is passed to hold it against rotation or movement, and its upper portion is cut away, as at $h$, to expose a portion of a disk, K, placed back of it, and bearing inscriptions indicating coming events, as at $g'$ $g^2$ $g^3$ $g^4$, Fig. 8, said disk being turned or set to bring the proper inscription opposite opening $h$. Back of guard F, and between said guard and disk K, are placed a plate or slide, G, bearing inscriptions indicating ante-meridian, meridian, post-meridian, and midnight, and a disk, H, having figures showing the days of the month from one to thirty-one, inclusive, arranged in a circle concentric with its axis. Guard F is provided with two openings, $b$ and $d$, and the inscriptions and figures of the slide or plate G and disk H can be brought one at a time opposite the respective openings, as in Fig. 1, said openings being preferably lettered "o'clock" and "on," respectively, as shown. Back of the disk H is placed the larger disk, K, already mentioned, and which, besides the inscription already mentioned, indicating coming events or like matter, has at the end of each inscription a radial slot or opening, as indicated at $f'\ f^2\ f^3\ f^4$. Behind disk K is placed a larger disk, L, having twelve radial openings, $j$, and at the inner end of each slot figures indicating an hour of the day, a thirteenth and larger opening, $l$, being made between those numbered twelve and one.

The figures showing hours from one to twelve can be brought one set at a time to that one of the openings $f'\ f^2\ f^3\ f^4$ of disk K that is exposed at the time at opening $h$ of guard or plate F to indicate any particular hour of the day, and in like manner the figures indicating numbers one to fifty-nine of a disk, M, immediately back of disk L, can be brought opposite to and read through the openings $j$ of plate L as a continuation of the figures indicating the hour. Thus in Fig. 1 the time 12:40 is indicated, and slide or plate G is set to indicate that afternoon is meant. Besides the figures 1 to 59, disk M bears a series of radially-arranged names of stations, as at $k$, which may be displayed through the elongated opening $l$ of disk L, instead of showing the hour or time, said opening $l$ being brought into line with the exposed opening of disk K, as above explained.

The disks are made of regularly-increasing diameter from the outer one, D, to the inner one, M, to facilitate their adjustment, and are separated by washers to prevent friction of one upon another.

I am aware that calendars have been made in which disks provided with figures and with names of days and months have been made capable of adjustment to bring their respective inscriptions opposite openings for reading, and I make no broad claim thereto.

I am aware that it is old to construct a calendar with concentric disks bearing the names of days, weeks, months, &c., and I make no claim thereto, broadly considered; but the special construction herein described and claimed is designed to adapt the calendar to co-operate with and form a part of the complete indicator, to which it is essential.

Having thus described my invention, what I claim is—

1. The herein-described indicator, consisting of a backing or board, a series of disks, D E H K L M N, and guards A F, constructed and inscribed, and arranged one behind another, substantially as described and shown, whereby they are adapted to show simultaneously the day of the week, the month, the year, a coming event, and a predetermined hour or time of the day, substantially as set forth.

2. The combination, in an indicator, of notched disk D, bearing names of days in line with the notches, guard F, provided with openings $b$ and $d$, slide G, provided with inscriptions indicating divisions of the day, and disk H, bearing figures indicating the days of the month, said slide and disk G and H being placed behind the guard F, substantially as described and shown.

3. The combination, in an indicator, of notched disk D, bearing the names of the days in line with the notches, disk E, placed behind disk D, and bearing the names of the month, guard F, having openings $b$, $d$, and $h$, slide or plate G, bearing inscriptions indicating divisions of the day, disk H, bearing figures indicating days of the month, and disk K, bearing inscriptions indicating coming events, said parts F G K being arranged substantially as shown to permit their inscriptions to be brought opposite the respective openings of guard F.

4. The combination of notched disk D, having the names of the days of the week in line with the notches, guard F, having openings $b$, $d$, and $h$, plate G, bearing inscriptions indicating divisions of the day, disk H, bearing inscriptions indicating days of the month, disk K, bearing inscriptions indicating coming events, and having radial slots or openings, and disk L behind disk K, bearing figures indicating hours of the day, all arranged to operate substantially as set forth.

5. The combination of notched disk D, having names of days in line with the notches, disk E behind disk D, and bearing the names of the months, guard F, having openings $b\ d\ h$, plate G, bearing inscriptions indicating divisions of the day, disk H, bearing figures indicating days of the month, disk K, bearing inscriptions indicating coming events and provided with slots or openings in its face, disk L, bearing figures indicating hours of the day, and openings, both arranged to register with the openings in the disk K, and disk M, bearing figures indicating the minutes of an hour, stations, or like matter arranged to register with the openings of disks K and L, all substantially as set forth.

GEORGE HONEY PRESTON.

Witnesses:
MARY PRESTON,
GEORGE PRESTON.